June 7, 1966  R. Z. HAGUE ETAL  3,254,572
POSITIONER
Original Filed Jan. 7, 1963  10 Sheets-Sheet 4

INVENTORS
ROBERT Z. HAGUE
HOWARD H. LAUCKS
CONRAD C. TREFF
BY Popp and Sommer
ATTORNEYS

INVENTORS
ROBERT Z. HAGUE
HOWARD H. LAUCKS
CONRAD C. TREFF
BY
ATTORNEYS

United States Patent Office 3,254,572
Patented June 7, 1966

3,254,572
POSITIONER
Robert Z. Hague, Oradell, Howard H. Laucks, Oakland, and Conrad C. Treff, New Milford, N.J., assignors to Moog Servocontrols, Inc., East Aurora, N.Y., a corporation of New York
Original application Jan. 7, 1963, Ser. No. 249,842, now Patent No. 3,198,084, dated Aug. 3, 1965. Divided and this application Sept. 23, 1964, Ser. No. 405,638
3 Claims. (Cl. 91—461)

This application is a division of copending application Serial No. 249,842, filed January 7, 1963, now U.S. Patent No. 3,198,084.

This invention relates to improvements in a positioner capable of moving a member from point to point, and more particularly to such a positioner of the pneumatic-hydraulic type.

The present invention is concerned with the control means of the positioner which are operatively associated with fluid operated actuator means which actually move the member.

A primary object of the present invention is to provide positioner control means in which the commands are selectively and alternatively controlled either by manually set dial members or by a perforated command tape.

Another object is to provide such positioner control means in which the dial members are easily manipulatable and which can be locked in their selected positions.

Another object is to provide such positioner control means which enables the dial members to be manually adjusted while the positioner is operating on a tape control basis so that the manual settings can become effective immediately upon converting the mode of operation to a manual control basis.

Another object is to provide such positioner control means in which a tape reader mechanism is employed having a novel construction.

A further object is to provide such positioner control means which include manual control means having a novel construction.

Other objects and advantages of the invention will be apparent from the following detailed description of a preferred embodiment as shown in the accompanying drawings wherein.

For background informaton about a pneumatic-hydraulic positioner, cross reference is made to this assignee's copending application of Hague et al., Serial No. 93,483, filed March 6, 1961 for Positioner. In that application table and saddle members were movable relative to each other and to a machine tool bed along X and Y axes, respectively.

Figures 4, 5, 6, 7:
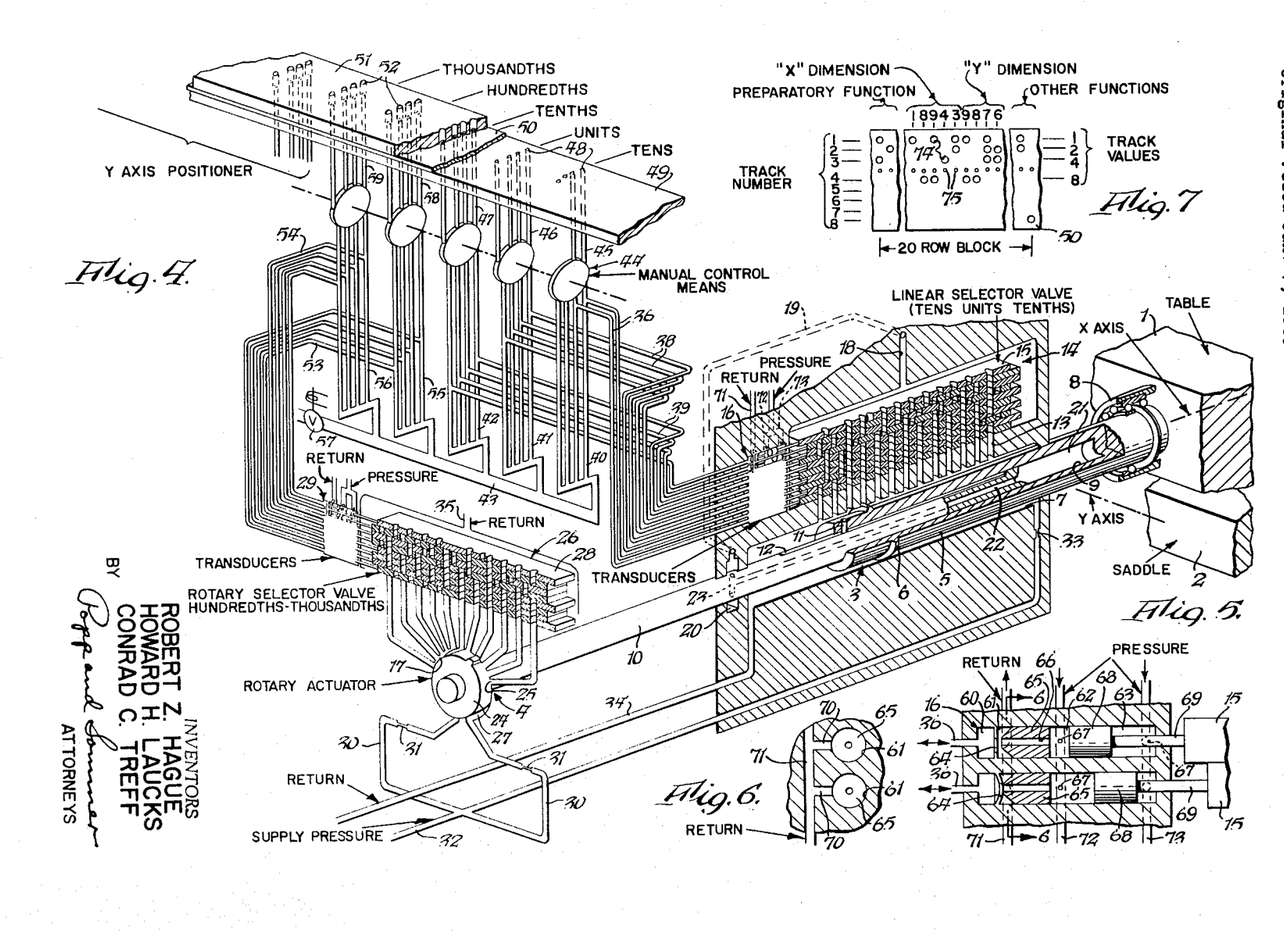
FIG. 4 is a schematic view of the positioner and associated control means constructed in accordance with the principles of the present invention.
FIG. 5 is an enlarged fragmentary sectional view through transducer means which are operatively associated with each of the selector valve assemblies.
FIG. 6 is a transverse sectional view of such transducer means, taken on line 6—6 of FIG. 5.
FIG. 7 is a top plan view of a fragmentary length of perforated command tape which is read by the tape reader mechanism of the present invention.
Figure 8:
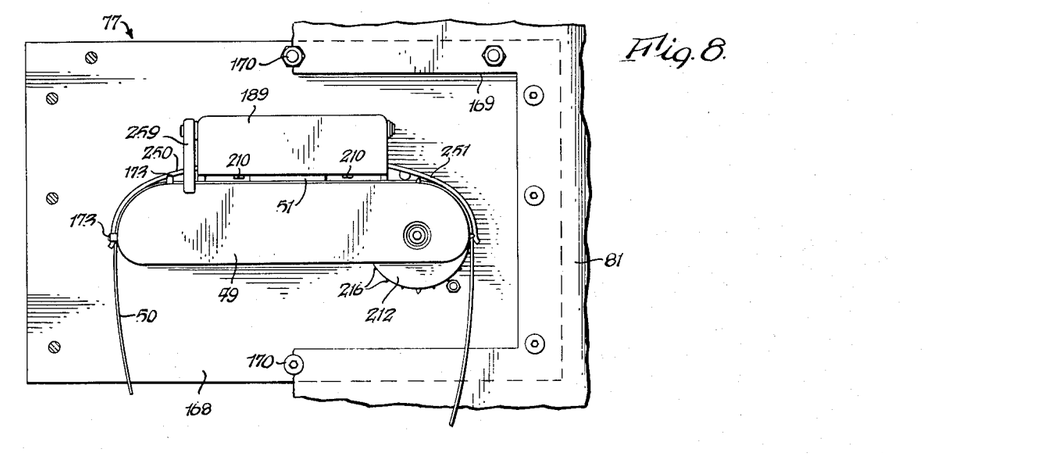
FIG. 8 is an enlarged front elevational view of the tape reader mechanism shown in FIG. 1, a portion of the console front wall for mounting the mechanism being illustrated.

Referring to FIG. 4 of the present disclosure, the numeral 1 represents a table member movable along an X axis relative to a saddle member 2 which is movable along a Y axis, both members being movably mounted on a machine tool (not shown) for example. In FIG. 4, the means for moving the table member 1 are diagrammatically illustrated. Similar means (not shown) would be associated with the saddle member 2.

A micrometer valve assembly indicated generally at 3 is operatively associated with the table 1 and a micrometer rotary actuator assembly indicated generally at 4 is operatively associated with the micrometer valve 3.

This micrometer valve 3 is shown as comprising a cylinder 7 in which a hollow piston rod 5 is slidably arranged, this rod carrying adjacent one end a piston in the form of a helical land 6 and having its opposite end rotatably mounted with respect to the table 1 as provided by the bearing indicated at 8. The hollow rod 5 has a cylindrical bore 9 in which an inner rod 10 is relatively slidable longitudinally. While the rod 10 is constrained against longitudinal movement relative to the cylinder 7, the hollow piston rod 5 is slidable thereover, thereby being movable relative not only to the rod 10 but also the cylinder 7. The rods 5 and 10 are constrained against relative rotative movement by any suitable means which still permit relative longitudinal movement between these members. As shown, such relative rotative prevention means comprises a pin 11 carried by the hollow rod 5 and projecting into a longitudinal groove 12 provided in the inner rod 10.

The wall of the cylinder 7 has a plurality of longitudinally spaced gauge point holes 13. Operatively associated with said holes 13 is a linear selector valve assembly indicated generally at 14. This assembly 14 comprises a plurality of valve plates 15 severally associated with pneumatic-to-hydraulic transducers individually indicated at 16.

The purpose of the linear selector valve assembly 14 is to determine a flow path between one of the gauge point holes 13 and a port 18 which is shown as connected via the conduit 19 with an annular chamber 20 which surrounds the inner rod 10 at one end of the cylinder 7. This annular chamber 20 has communication with a chamber 21 formed between the closed inner end of the hollow rod 5 and the inner end of the inner rod 10 via a longitudinal passage 22 provided centrally in the inner rod 10 and communicating at one end with the chamber 21 and at its opposite end with a transverse through hole 23 which communicates at opposite ends with the annular chamber 20.

The micrometer rotary actuator assembly 4 includes a vane member 24 fast to the inner rod 10 and rotatable in a housing having a series of circumferentially spaced ports 25. Thus chambers 17 and 27 are provided on opposite sides of the vane of member 24. Operatively associated with the ports 25 is a rotary selector valve assembly indicated generally at 26. This assembly 26 includes a plurality of valve plates 28 severally associated with pneumatic-to-hydraulic transducers individually indicated at 29. The actuator chambers 17 and 27 are supplied with hydraulic fluid under pressure. As shown, a pair of branch conduits 30 each having a restriction 31 therein is shown as extending between a main hydraulic fluid supply conduit 32 and the chambers 17 and 27. The main supply conduit 32 is shown as having a restriction 33 therein adjacent one end of the cylinder 7 with which such conduit communicates. The opposite end of this cylinder is shown as communicating with a return conduit 34. The rotary selector valve assembly 26 is shown as operatively associated with a return conduit 35.

The positioner thus has means for moving a member such as the table 1, such means comprising hydraulic fluid operated actuator means such as the micrometer valve assembly 3 and micrometer rotary actuator assembly 4, together with means such as the selector valve assemblies 14 and 26 for controlling flow of hydraulic fluid with respect to the actuator means 3 and 4.

The present invention is concerned primarily with the mechanism for causing the various transducers 16 and 29 to operate. Still referring to FIG. 4, some of the transducers 16 are shown as being associated with control conduits individually identified by the numeral 36, others with control conduits 38, and still others with control conduits 39. The various conduits 36, 38 and 39 are shown as connected to branch air supply conduits 40, 41 and 42, respectively, which stem from a main compressed air supply conduit 43. The conduits 40–42 are shown as operatively associated with manual control means indicated generally and collectively at 44. Such manual control means 44, as will be explained in detail infra, are adapted to connect the various conduits 40–42 to the atmosphere so as to vent them in accordance with certain manually set command adjustments or such manual control means 44 are alternatively and selectively operative to establish communication between the conduits 40–42 and conduits 45–47, respectively, which terminate as a predetermined array of ports 48 in an upper surface or track of a reader head 49 over which a perforated command tape 50 is arranged, the tape being held down by a vent block 51 having vent ports 52 arranged in a second array whereby the ports 48 and 52 are severally aligned.

Some of the transducers 29 are shown as being associated with control conduits individually identified by the numeral 53, and others with control conduits 54. These conduits 53 and 54 are shown as connected to branch air supply conduits 55 and 56, respectively, which stem from the main compressed air supply conduit 43. A solenoid valve 57 is arranged in the conduit 43 upstream of the various branch conduits. The conduits 55 and 56 are shown as operatively associated with the manual control means 44 which is adapted to connect these conduits to the atmosphere or to conduits 58 and 59, respectively which terminate in the reader head surface 49 as more ports 48.

The pneumatic-to-hydraulic transducer means 16 and 29 are similar and hence a description of one will be considered applicable to all. As shown in FIGS. 5 and 6, the two transducers illustrated may be considered representative of those identified individually as 16 and shown in association with the valve plates 15 of the selective valve assembly 14. Each transducer 16 is shown as having means providing four chambers 60–63. A flexible imperforate diaphragm 64 separates the chambers 60 and 61. A nozzle 65 separates the chambers 61 and 62 and this nozzle has a through hole 66 which connects these chambers. The chambers 62 and 63 are separated by a double acting piston 68 which is connected via the rod 69 to one end of the corresponding valve plates 15. The various chambers 61 are connected via lateral branch conduits 70 to a main return conduit 71, as shown in FIG. 6. The various chambers 62 are manifolded by similar lateral branch conduits 67 to a pressurized hydraulic fluid supply conduit 72. The various chambers 63 are similarly manifolded to a second pressurized hydraulic fluid supply conduit 73. The chamber 60 of each transducer is connected to the manual control means 44 via one of the lines 36, 38 or 39, considered to be typically one of conduits 36 in FIG. 5.

It will be seen that the transducer chamber for pneumatic fluid is provided by the interconnected chamber 60, conduit 36 and any further conduit which the manual control means 44 may place in communication therewith. Normally pressurized air is present in the chamber 60 as depicted for the lower transducer illustrated in FIG. 5. This pressurized pneumatic fluid flexes the diaphragm 64 against the outlet end of the corresponding nozzle 65 so as to prevent hydraulic fluid from flowing out of the chamber 62 through the nozzle hole 66. Since the end face of the corresponding piston 68 which faces the corresponding chamber 62 has a larger area than the opposite end face, the latter being of smaller area by reason of the outward projection of the piston rod 69, a force is developed against the left end face of the piston to move the same rightward. This extreme rightward position may be assumed to be the initial position of the piston 68. Viewed in another light, if the pneumatic fluid in the corresponding transducer chamber 60 is reduced to a predetermined level, the corresponding diaphragm 64 will unseat from the nozzle 65 and allow the chamber 62 to be vented to drain via the communicating passages 66, 70 and 71. Thus the pressure of hydraulic fluid in chamber 62 is reduced and the force created against the piston due to the higher pressure in chamber 63 will drive this piston to the left as viewed in FIGURE 5 and as represented by the upper transducer illustrated therein.

From the foregoing, it will be seen that the operation of the various valve plates of the selector valve assemblies 14 and 26 may be controlled individually by either allowing the pressure within the corresponding transducer chamber 60 to be maintained at a high level or to reduce it by venting this chamber to the atmosphere, thereby affecting operation of the corresponding transducer.

The function of the manual control means 44 is either to vent the various transducer chambers 60 in the desired manner determined by manually set members when the positioner is adjusted for a manual control mode of operation, or to vent these chambers in accordance with the pattern of perforations in the perforated command tape 50 when the positioner is adjusted for a tape control mode of operation.

Referring to FIG. 7, there is there illustrated a fragmentary length of a conventional form of perforated command tape 50. The perforations 74 are determined according to a binary numbering system and arranged in several rows or tracks, all as is well understood by those skilled in the art. For example, eight tracks are shown but for the purposes of controlling the present positioner only the first four tracks are employed, track 1 having a value of one, track 2 a value of two, track 3 a value of four and track 4 a value of eight. A row of smaller perforations 75 is shown as arranged between tracks 3 and 4 and these perforations 75 cooperate with a sprocket drive wheel for the tape, as explained infra. Various combinations of perforations 74 in tracks 1–4 will produce any desired number from zero to nine. With a given length of tape 50 such as a twenty row blocks, a certain portion of the length of the block can be utilized for determining the X dimension, another longitudinal portion for determining the Y dimension, and still other longitudinal portions for either preparatory functions or other functions as indicated in FIG. 7. As shown there, five transverse rows of perforations 74 are reserved for designating the X dimension and four such transverse rows for designating the Y dimension.

*Manual control mechanism*

The positioner control means of the present invention comprise a manual control mechanism 44X for the X axis and a similar manual control mechanism 44Y for the Y axis, a tape reader mechanism 77, and a selectively operable mode control means 78 for alternatively actuating manually settable means such as dial members described infra of the mechanisms 44X, 44Y or the tape reader mechanism 77. The various means 44X, 44Y, 77 and 78 are shown as mounted on a console or cabinet indicated generally at 79 having an inclined control panel 80 on which the mechanisms 44X and 44Y are mounted, as well as the selective control means 78, and a front wall 81 on which the tape reader mechanism 77 is mounted.

The mechanisms 44X and 44Y are similar. Hence a description of the mechanism 44X is intended to be applicable to both, except as will be otherwise specifically noted.

Figure 20:
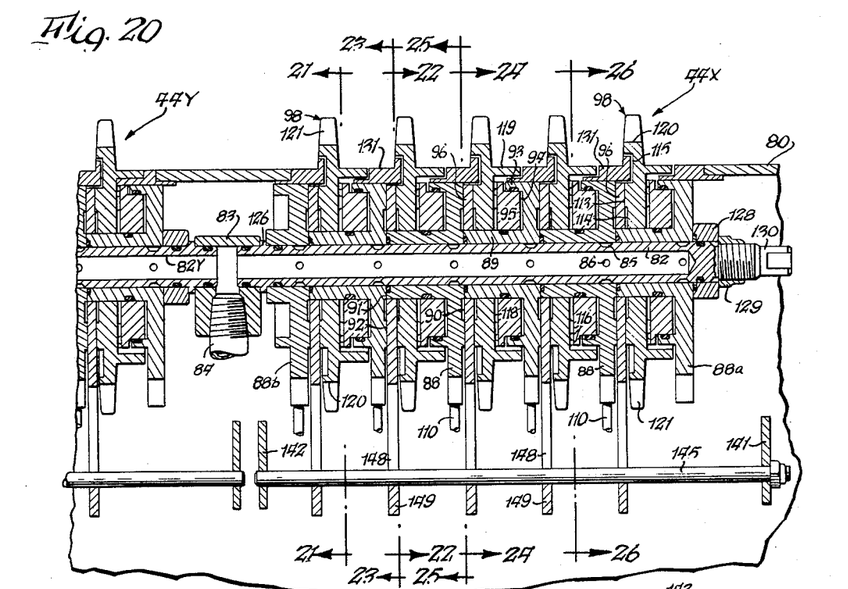
FIG. 20 is a fragmentary longitudinal sectional view thereof, taken on line 20—20 of FIG. 19.

Referring particularly to FIG. 20, the manual control mechanism 44X for the X axis is shown as comprising a hollow shaft or tube 82 closed at one end and open at its opposite end, the latter mounting a T 83 to which a conduit 84 is connected, this conduit supplying compressed air. The conduit 84 is comparable to the conduit 43 shown in FIG. 4. The hollow shaft or tube 82 is shown as provided with a series of axially spaced annular grooves 85 in its outer periphery which communicate with the interior of the shaft via a series of circumferentially spaced radial holes 86. Arranged over each annular groove 85 is an annular mounting plate or port member 88 which has a hub 89 which surrounds the shaft.

Figures 23, 24, 25, 26:
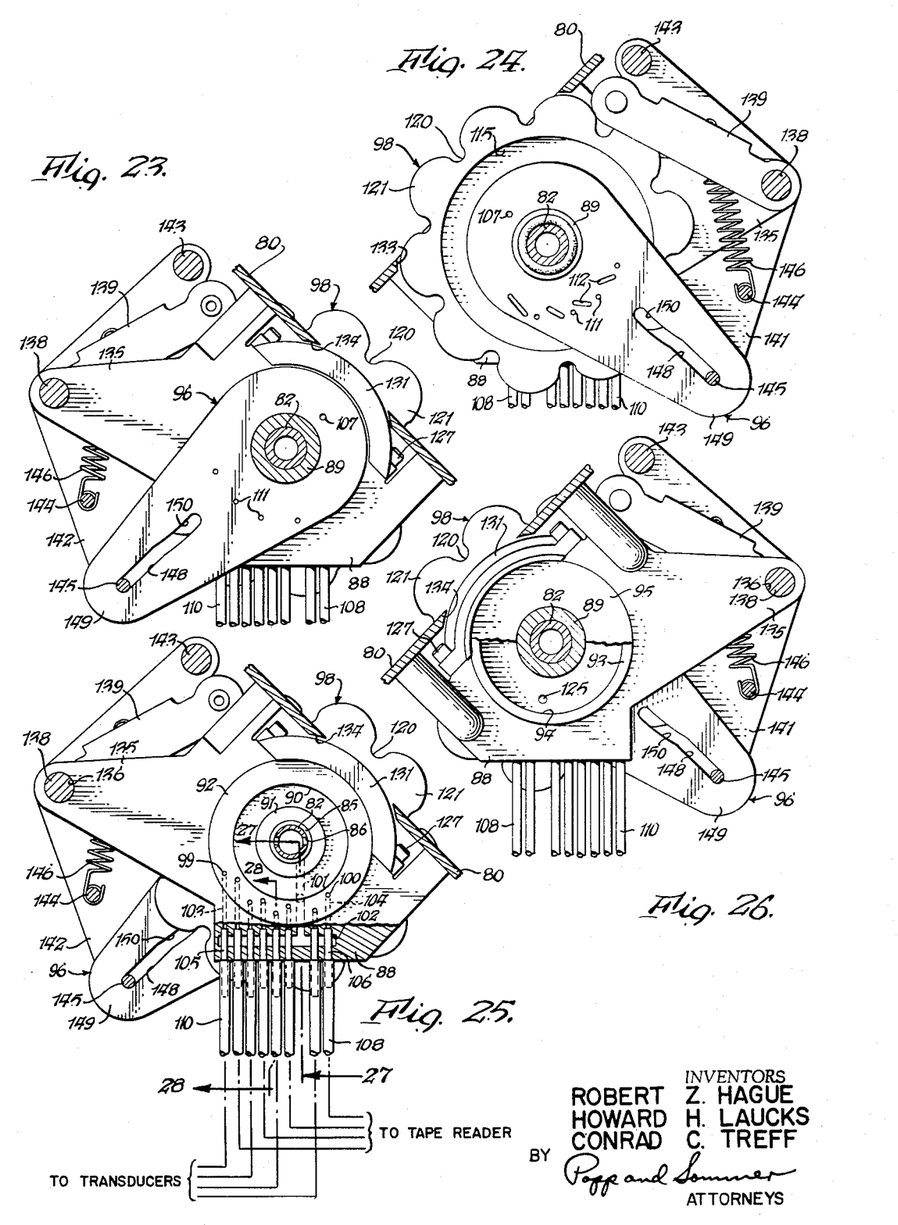
Figure 34:
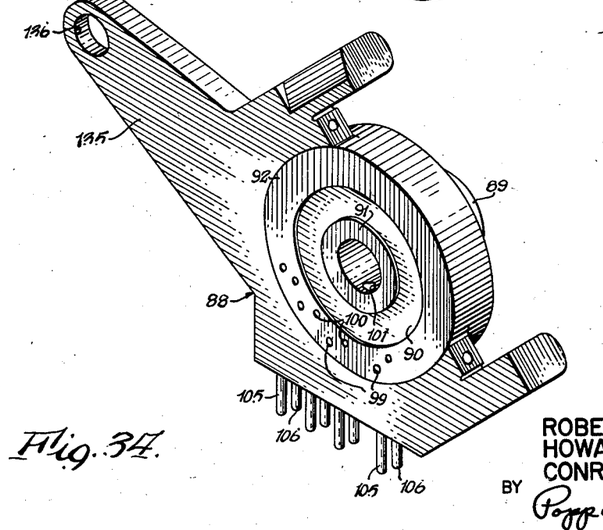
FIG. 34 is a perspective view of a mounting plate or port member forming an element of the manual control means.

As best shown in FIGS. 25 and 34, one axially facing end face of the radial portion of the member 88 is provided with a shallow annular recess 90 so as to leave an inner annular land 91 and an outer annular land 92. As best shown in FIG. 26, the opposite side of the member 88 is provided with an axially extending annular portion 93 to provide an annular recess 94 in which an annular piston member 95 is slidably arranged.

Figure 32:
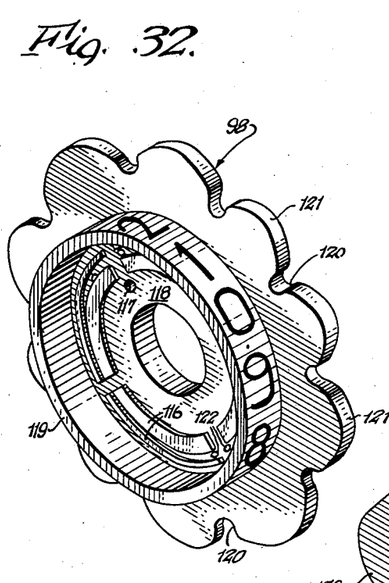
FIG. 32 is a perspective view of a dial member forming an element of the manual control means.
Figure 33:
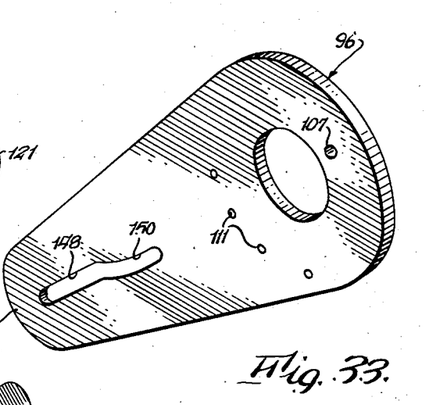
FIG. 33 is a perspective view of a mode member forming an element of the manual control means.

Arranged against the outer land surface 92 is a flat sided annular mode member 96, best illustrated in FIG. 33. Arranged against this member 96 is an annular dial member 98, best illustrated in FIG. 32. Both members 96 and 98 surround the hub 89 of one of the adjacent port members 88, as best shown in FIGS. 27 and 28.

Figure 27:
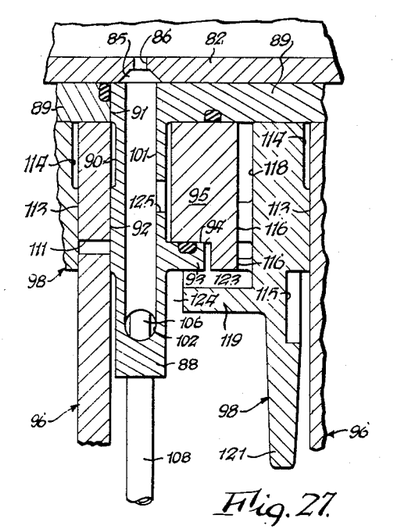
FIG. 27 is an enlarged fragmentary vertical sectional view thereof, taken on line 27—27 of FIG. 25.
Figure 28:
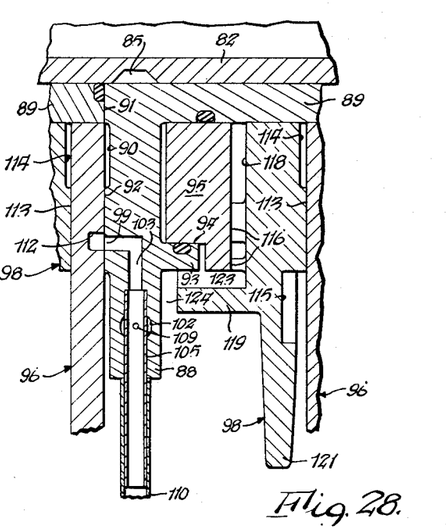
FIG. 28 is a similar enlarged fragmentary vertical sectional view thereof, taken on line 28—28 of FIG. 25.

Referring to FIGS. 20, 27 and 28, it will be seen that the end face of the hub 89 of one port member 88 abuts against the inner annular land 91 of the adjacent port member 88. Any leakage of air through this abutting juncture can be received in the recess 90 and vented in a manner explained infra.

As shown in FIG. 25, each of the port members 88 with the exception of the end member 88a (FIG. 20) is provided with a first series of circumferentially spaced ports 99 disposed in the outer land 92 and lying on a circular centerline having a first radius generated about the central longitudinal axis of the hollow shaft or tube 82. This outer land 92 is also provided with a second series of circumferentially spaced ports 100 lying on a circular centerline of smaller radius generated about the same axis.

Figure 31:
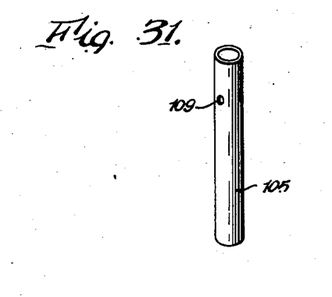
FIG. 31 is a perspective view of one of the apertured tubes as shown in FIG. 28.

The body portion of the member 88 is formed internally as shown in FIG. 27 to provide a generally radially extending passage 101 which at its inner end communicates with the corresponding one of the annular grooves 85 in the shaft 82 and at its outer end with a transverse manifold chamber 102. Vertical passages extend across the horizontal manifold chamber 102 and connect with the various ports 99 and 100, the passages terminating in the ports 99 being identified at 103 and those terminating in the ports 100 at 104. To traverse the manifold passage 102, these various passages 103 and 104 are enlarged in their lower portions to receive tubes which project outwardly from the bottom of the port member 88. Those tubes associated with the passages 103 are identified at 105 and those associated with the passages 104 at 106. The tubes 106 are imperforate and their exposed lower ends are connected severally by lengths of flexible tubing 108 to the tape reader mechanism 77 as explained infra. The other tubes 105, one of which is illustrated in FIG. 31, is not imperforate as it traverses the manifold chamber 102 but rather has a restricted orifice or aperture 109 which communicates with the chamber 102. The exposed lower ends of the tubes 105 communicate severally with the corresponding transducer assembly 16 or 29 via lengths of flexible tubing 110.

It will thus be seen that pressurized air flows from the interior of the shaft or tube 82 through the communicating passages 86, 85 and 101 into the manifold chamber 102. From this chamber the air can enter the various apertures 109 in the tubes 105 to fill the associated passages 103 and the interiors of the tubes 105 and 110 with air under pressure. However, if the consolidated chamber so provided by the passage 103 and the interiors of the tubular elements 105 and 110 leading to the corresponding transducer chamber 60 is vented to the atmosphere, say by venting the port 99 to the atmosphere, the pressure cannot be maintained in this consolidated transducer chamber and this will operate the transducer to move the corresponding diaphragm 64 from the closed to the open position depicted at the bottom and top, respectively, of FIG. 5. The position of the mode member 96 controls whether the transducer chambers will be vented by the dial member 98 or the tape reader mechanism 77.

Referring to FIGS. 23 and 24, the mode member 96 has a plurality of holes 111 extending axially therethrough and arranged at circumferentially spaced intervals on a circular centerline having the same radius as that for the ports 99 in the port member 88. As shown in FIG. 24 the axially facing side of the mode member 96 which opposes the land 92 of the adjacent mode member 88 is provided with a series of channels or recesses 112 adapted to establish communication between predetermined pairs of ports 99 and 100. If the mode member 96 is in a position where the holes 111 are aligned with the ports 99, these holes merely transmit the air to the corresponding dial member 98 for a purpose explained infra. On the other hand, if the mode member 96 is in a position whereby the channels 112 are rendered effective, these channels operate to couple or place in communication corresponding pairs of the ports 99 and 100. This operates to place the various lines 108 leading to the tape reader mechanism 77 in communication with the various lines 110 leading to the transducer assemblies.

Relating FIG. 25 to FIG. 4, the lines 108 shown in FIG. 25 are comparable to any of the lines 45, 46, 47, 58 and 59 shown in FIG. 4, and the lines 110 in FIG. 25 are comparable to any of the lines 36, 38, 39, 53 and 54 shown in FIG. 4.

Figures 21, 22:
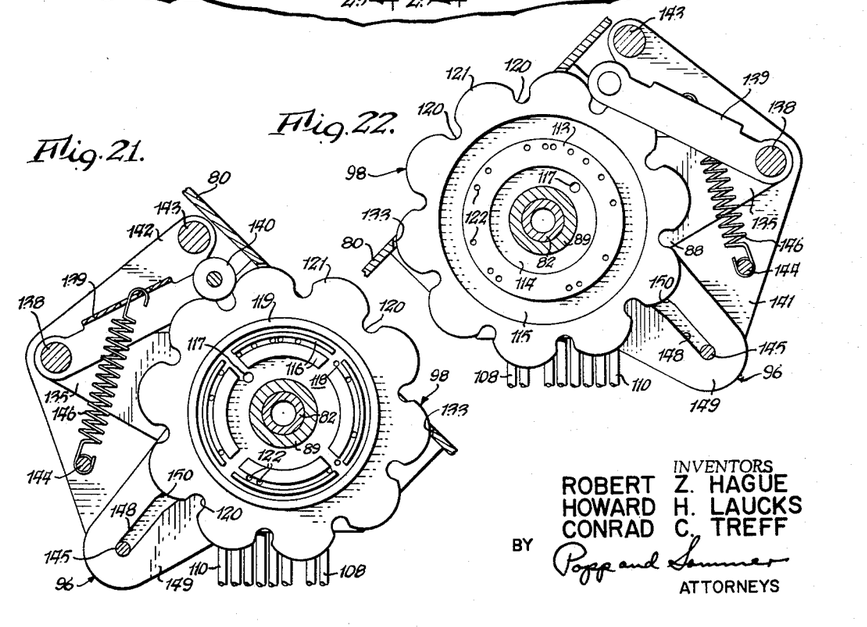
FIGS. 21–26 are vertical transverse sectional views thereof, taken on the correspondingly numbered lines of FIG. 20.

The dial member 98 is an annular member having opposite axially facing sides. As shown in FIG. 22, that side which opposes the corresponding mode member 96 is provided with an annular land 113 which is intermediate a relatively shallow inner annular recess 114 and an outer deeper annular recess 115. The opposite side of the dial member has radially a circumferentially interrupted coplanar land surface 116 outstanding from a recessed surface 118, as shown in FIGS. 21 and 32.

Within the confines of the annular recessed area 114, the dial member 98 has an axial through opening 117 to the opposite recessed surface, as shown in FIGS. 21 and 22. The mode member 96 has an axial through opening 107, as shown in FIGS. 23 and 24, which is located so as to communicate at all times with the annular recesses 90 and 114. In this manner, the chamber 90 in which air leakage collects is always vented.

The dial member 98 has an axially extending annular flange 119 extending outwardly from that side of the member provided with the land surfaces 116. The periphery of the annular flange 119 is provided with ten numbered stations, zero to nine, as shown in FIG. 32. Opposite each numbered station the periphery of the dial member is provided with a radial notch 120 so that peripheral portions of the dial periphery project outwardly as nodes or rounded projections 121 between adjacent pairs of notches 120.

The dial member 98 is provided with a series of holes 122 extending axially therethrough and arranged at predetermined circumferentially spaced intervals on a circular centerline having a radius corresponding to that for the ports 99 in the port member 88. It will be seen that by annularly positioning the dial member 98, various combinations of holes 122 can be aligned with the ports 99. Since the holes 122 communicate with the atmosphere by reason of the radial clearance 123 which exists between the recessed surface 118 and the opposing face of the corresponding piston 95, and the radial clearance 124 which exists between the flange 119 and the peripheries of this piston 95 and the adjacent port member 88, as shown in FIGS. 27 and 28, the ports 99 can be vented to the atmosphere in accordance with a predetermined arrangement determined by the selective setting of the manually settable dial members 98.

A piston 95 is provided for clamping each assembly comprising the corresponding dial member 88 and mode member 96 against the corresponding fixed immovable port member 88. The piston 95 derives a working fluid through a hole 125 provided in the wall of the port member 88 between the passage 101 therein and the annular recess 94, as shown in FIGS. 26 and 27. Thus when pressure is present in the interior of the hollow shaft 82, such pressure will work against the piston 95 and urge the same against the lands 116 of the dial member 98. In turn the dial member land 113 is forced against the opposing flat side surface of the mode member 96 which will have its opposite flat side surface, which is provided with the channels 112, pressed against the land 92 on the adjacent port member 88.

Referring to FIG. 4, it will be seen that there are five digits assigned for the X axis, severally signifying tens, units, tenths, hundredths, and thousandths. There are therefore five dial members 98 for the X axis, each of which will be associated with a corresponding one of the digits. As viewed in FIGS. 2 and 20 the right end member 88a has no ports 99 and 100 and is provided only with air for servicing the adjacent piston 95 on its left. Since the other or left end member 88b does not have a piston, it will be unprovided with the hole 125 as shown in FIG. 27. However, it will have ports 99 and 100 to cooperate with the mode member 96 on its right.

The assembly of end members 88a and 88b and intermediate port members 88 are arranged so that their various hubs 89 abut each other and the end member 88b is shown as abutting a shoulder 126 formed on the shaft 82. The end member 88a at the opposite end is engaged by an annular retainer 128 against which a nut 129 bears, this nut being screwed onto a threaded portion 130 provided on the corresponding end of the shaft 82.

As shown in FIGS. 3, 19, 20, 23 and 26, portions of the periphery of the various port members 88 are covered by arcuate seal members 131 secured by screws 127 screwed into the port members. The radially outstanding flange on each member 131 is received in the annular recess 115 of the adjacent dial member as shown in FIG. 20.

The assembly 44X is secured to the inside of the inclined control panel 80 by screws 132 which pass through holes provided in the panel 80 and are received in threaded recesses provided in the end members 88a and 88b. The control panel 80 is provided with slots 133 through which the peripheral portion of the dial members 98 project, the central portion of each slot being enlarged on one side as indicated at 134 in FIG. 1 to permit the number on the flange 119 of the corresponding dial member to be viewed by the operator.

Individual detent means are provided for the various dial members 98 yieldingly to hold them in any adjusted station. For this purpose, the end members 88a and 88b and intermediate port members 88 are severally provided with a rearwardly extending arm portion 135. The outer ends of these arms severally have aligned holes 136 which receive a pivot bar 138. A detent arm 139 is pivotally mounted at one end on the pivot bar 138 between each pair of adjacent port members and has a roller 140 at its opposite end. The roller 140 rides on the noded and recessed periphery of the corresponding dial member 98.

Pivotally mounted on the opposite ends of the pivot bar 138 are a pair of end plates 141 and 142 arranged laterally outwardly of the endmost port members 88a and 88b. Three parallel bars connect the end plates 141 and 142 in addition to the pivot bar 138, these additional bars including an actuator bar 143, a spring anchor bar 144 and a shift bar 145. Detent springs 146 are individually connected at one of their ends to the anchor bar 144 and at their opposite ends severally to the detent arms 139 at a place intermediate the ends of such arms, as shown in FIG. 21.

Figure 19:
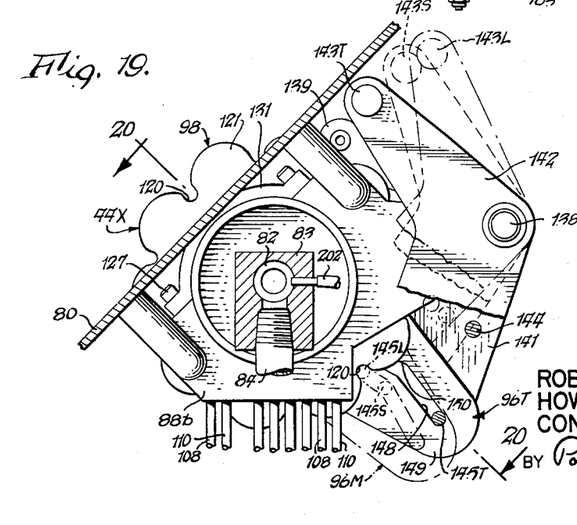
FIG. 19 is an enlarged fragmentary vertical transverse sectional view of the manual control mechanism, taken on line 19—19 of FIG. 2.

The shift bar 145 is a rod which extends transversely through a slot 148 provided in a lateral arm extension 149 integrally formed with the annular portion of each of the mode members 96. The slot 148 extends generally radially outwardly from the annular portion of the mode member and includes an inner arcuate portion 150 which begins adjacent the inner end of the dial member notches 120 and is generated about the longitudinal axis of the pivot bar 138. When the shift bar 145 is in the arcuate portions 150 of the slots 148, it is capable of entering the notches 120 in the dial member peripheries. When so entering such notches, the dial members 98 are locked against rotation. However, when the shift bar 145 is toward the radially outer end of the arcuate portions 150 so as to be withdrawn from the notches 120, the various dial members 98 are free to be rotated while there still has been no shift in angular position of the mode members 96. As shown in FIG. 19, the position of the shift member 145 is in a locked or dial position when at 145L, at a set position when at 145S, and in a tape position when at 145T. When the shift bar is either in the 145L or 145S positions, the mode members 96 are in the manual control position 96M depicted in FIG. 19 and when the shift bar is at the 145T position the mode members are in the tape control position depicted at 96T. Corresponding to the various shift bar positions 145L, 145S and 145T are the respective actuating bar positions 143L, 143S and 143T.

Figure 1:
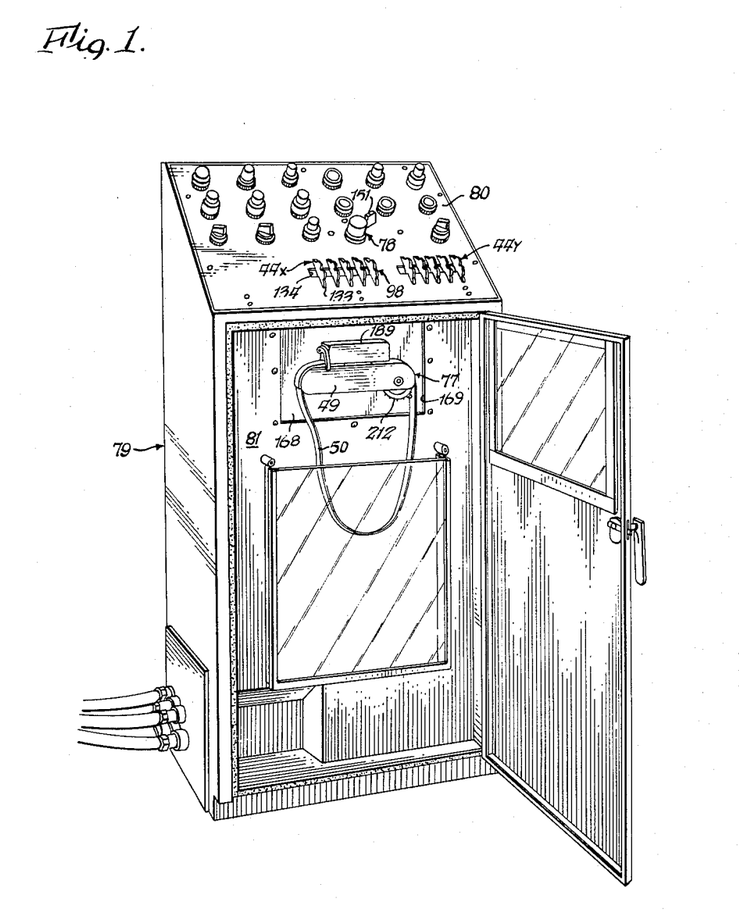
FIG. 1 is a perspective view of a console or cabinet housing the novel positioner control means of the present invention, and showing the front door open to permit access to the tape control mechanism.
Figure 17:
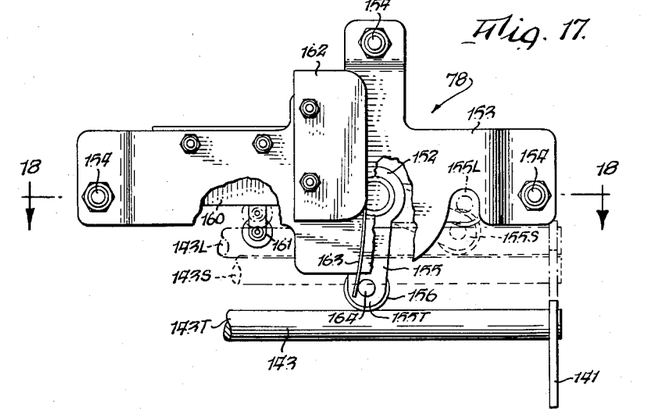
FIG. 17 is an enlarged fragmentary rear elevational view of the selective control mechanism mounted on the inclined control panel of the console, this view being taken generally on line 17—17 of FIG. 3.
Figure 18:
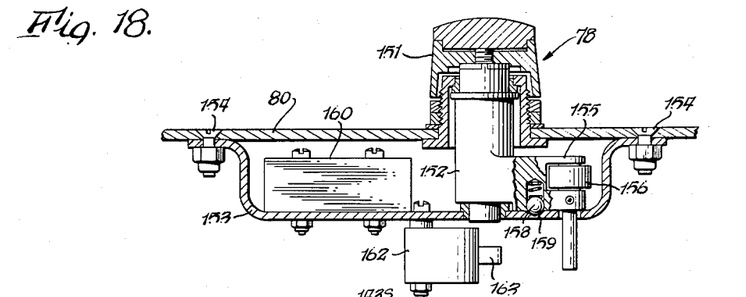
FIG. 18 is a horizontal transverse sectional view thereof, taken on line 18—18 of FIG. 17.

The selective control means 78 on the control panel 80 are operatively associated with the actuator bar 143 of the manual control assembly 44X. Referring to FIGS. 1, 17 and 18, the means 78 are shown as comprising, a knob lever 151 fast to the upper end of a shaft 152 which extends perpendicularly to and through a hole provided in the inclined control panel 80. The upper end of this shaft 152 is suitably journalled on the panel 80 and the lower end is suitably journalled on a bracket 153 secured in any suitable manner to the control panel 80 as by the screw and nut fasteners 154. The shaft 152 is shown as formed with an integral radially outwardly extending arm 155 carrying a roller 156 at its outer end. This roller 156 is adapted to engage the actuator bar 143. The arm 155 is capable of assuming three positions designated in FIG. 17 as 155L, 155S and 155T. A spring loaded ball detent 158 cooperating with three recesses one of which is represented at 159 in FIG. 18 provide means for yieldingly holding the selective control means 78 in any of the three desired positions, namely, lock, set and tape, these positions corresponding to the suffixes "L," "S" and "T."

The bracket 153 is shown as carrying a first pressurized fluid enabling switch 160 having a trip arm 161 adapted to engage the actuator bar 153. The bracket 153 also carries a second pressurized fluid enabling switch 162 having a trip arm 163. The arm 163 is adapted to be engaged by a finger 164 extending laterally from the outer end of the arm 155. The trip arm 161 for the switch 160 engages the actuator bar 143 when in its locked position 143L but disengages this bar when in its set position 143S. The function of the switch 160 is to close a circuit through the air solenoid valve 57 (FIG. 4) and thereby control the application of pressurized pneumatic fluid to the manual control means 44X and 44Y, such switch operating to not apply such pressure when the actuator bar 143 is in the set position 143S. The finger 164 does not engage the trip arm 163 of the switch 162 until the arm 155 is in the tape position 155T. When in this position the switch 162 will close a circuit through the air solenoid valve 57 and thereby control the application of pressurized pneumatic fluid to the manual control means 44X and 44Y.

Figure 2:
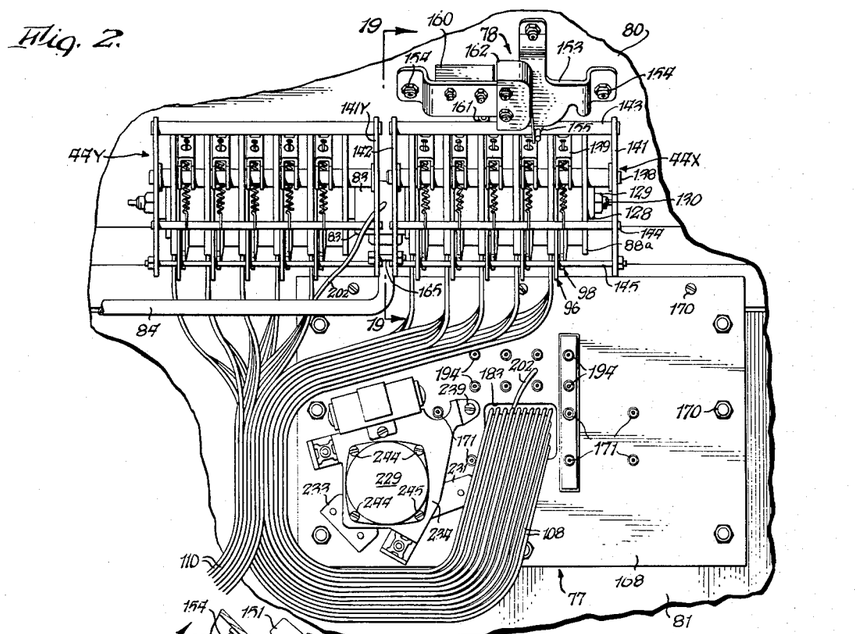
FIG. 2 is a fragmentary rear elevational view, on an enlarged scale, of the manual control mechanism and tape reader mechanism included in the console as shown in FIG. 1.

The assembly comprising the actuator bar 143, spring anchor bar 144 and shift bar 145, all connected at their opposite ends to the end plates 141 and 142, is movable as a unitary structure above the axis of the pivot bar 138. The similar bar assembly for the manual control means 44Y is coupled to that for the manual control mechanism 44X. While this may be accomplished in any suitable manner, it is shown in FIG. 2 as achieved by connecting the opposing end plates 142 and 141Y by means of a bolt or pin 165. The manual control mechanism 44X is arranged so that its pivot bar is concentric to the pivot bar 138 for the mechanism 44X. The mechanism 44Y is similar in construction to that for the mechanism 44X. A difference is that the hollow shaft or tube 82Y of the mechanism 44Y is shown reversed so that its open end can be received in the T 83 so as to receive compressed air supplied by the conduit 84.

*Tape reader mechanism*

The tape reader mechanism 77 is shown as comprising a back plate 168 having a rectangular outline and arranged behind the front wall 81 of the console and having its marginal portion overlapping a rectangular opening 169 provided in such wall. Suitable fasteners indicated at 170 such as nuts and bolts are arranged at intervals along the overlapping portions of the plate 168 and wall 81 to pass through registered holes provided therein for fastening these members together.

The back plate 168 has mounted thereon the fixed lower reader head 49 which is in the form of a block. As best shown in FIG. 2, the fixed block 49 is held to the front face of the plate 168 by a series of screws 171, six being shown, which have threaded shanks passing through holes provided in the back plate 168 and received in threaded recesses provided in the block 49.

Figure 13:
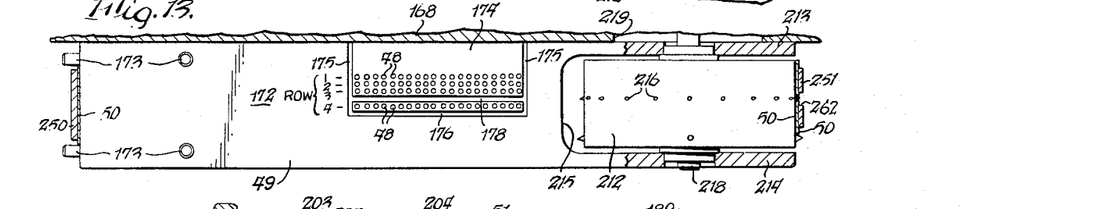
FIG. 13 is a horizontal transverse sectional view thereof, taken on line 13—13 of FIG. 12.
Figures 14, 15, 16:
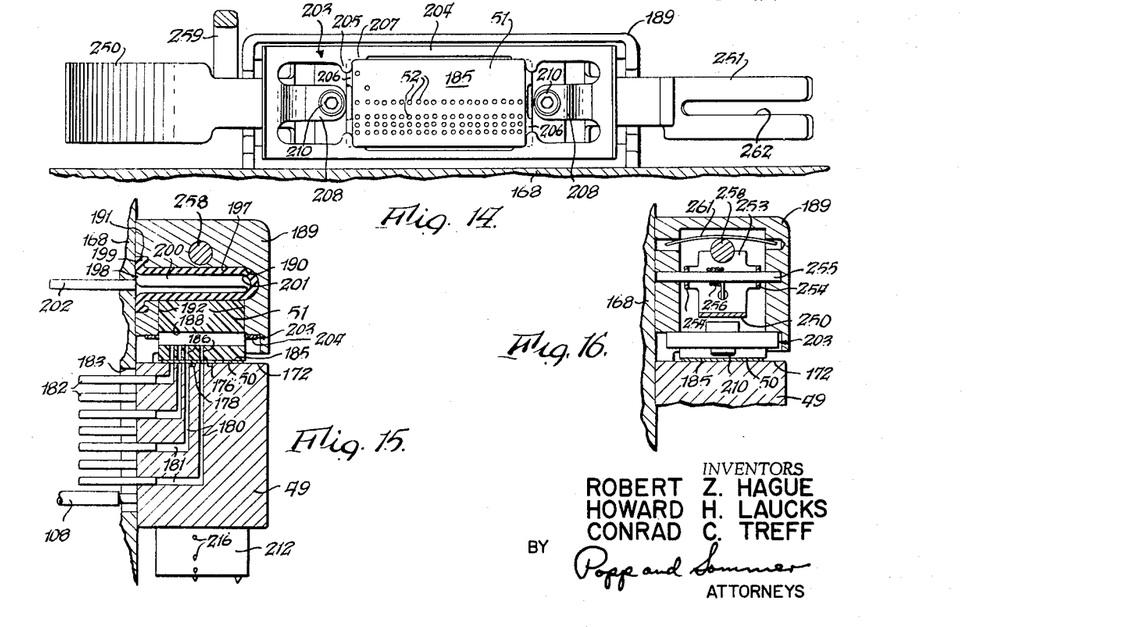
FIG. 14 is a horizontal transverse sectional view thereof, taken on line 14—14 of FIG. 12.
FIG. 15 is a vertical transverse sectional view thereof, taken on line 15—15 of FIG. 12.
FIG. 16 is a fragmentary vertical transverse sectional view thereof, taken on line 16—16 of FIG. 12.

This block has an upper flat horizontal surface 172 over which the perforated command tape 50 is drawn, such tape being guided in its travel toward the upper flat surface 172 by outwardly projecting transversely and longitudinally spaced guide pins 173 outstanding from the curved entrance end of the block 49. As shown in FIG. 13, the central portion of the track surface 172 of the block 49 is provided with a rectangular area 174 defined on three sides by two grooves 175 connected by a first longitudinal groove 176. A second longitudinal groove 178 is arranged within the area 174 and extends parallel to and spaced from the groove 176. Three rows of ports 48 are arranged between the back plate 168 and the longitudinal groove 178, these rows being numbered in FIG. 13 as 1, 2 and 3. A fourth row of such ports 48 is arranged between the two grooves 176 and 178. The various ports 48 in the array disclosed are the upper termini of vertical passages 180 provided in the block 49. The lower ends of these passages 180 communicate with the inner ends of horizontal passages 181 which open to the rear face of the block 49, as shown in FIG. 15. These horizontal passages 181 severally receive nipples or short lengths of tubes 182 which project outwardly through an opening 183 formed in the back plate 168. Connected to these nipples 182 are the ends of the lengths of flexible tubing 108 shown in FIG. 25. The tubing 108 and passages 181 and 180 shown in FIG. 15 are comparable to the conduits 45–47, 58 and 59 shown in FIG. 4.

The tape reader mechanism 77 also includes the vent block 51 which is arranged above the track surface 172 for vertical movement toward and away from such surface. This block 51 has a flat lower horizontal surface 185 the shape and area of which correspond to that of area 174 and as shown in FIG. 14 includes an array of ports 52 similar to the array of ports 48 shown in FIG. 13. Thus four rows of ports 52 are provided which are adapted severally to be vertically aligned with the ports 48. The ports 52 are the lower termini of vertical passages 186 provided in the block 51. The upper ends of adjacent ones of these vertical passages 186 communicate with enlarged transverse holes 188 which extend horizontally across the movable block 51 and open at opposite ends to the sides of this block. In this manner, the ports 52 communicate with the atmosphere.

Figure 12:
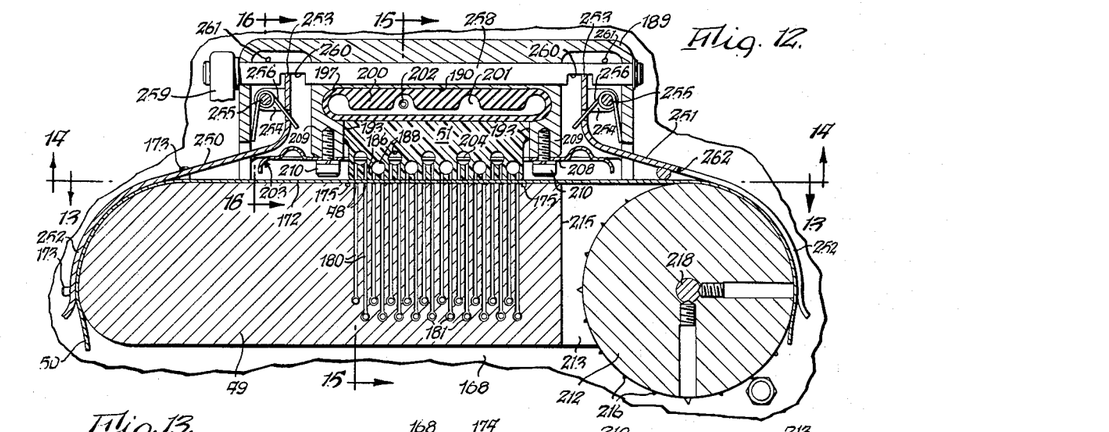
FIG. 12 is an enlarged fragmentary vertical sectional view of the tape reader mechanism shown in FIG. 8.

As shown in FIGS. 12 and 15, the movable block 51 is arranged within a housing 189 which is formed with a recess 190 which is relatively narrow in a vertical direction but is enlarged as it opens to the rear face of the housing 189 as indicated at 191. This recess 190 also has an opening at its lower surface which communicates with a chamber for the block 51 which is formed by vertical longitudinal surfaces 192 and vertical transverse surfaces 193 on the housing 189. The housing 189 is arranged on the front side of the back plate 168 and is secured thereto in any suitable manner as by a plurality of screws 194, eight being shown in FIG. 2, each of which has a threaded shank passing through a hole provided in the back plate 168 and received in threaded recesses provided in the housing 189. The vertical sides of the movable block 51 which is generally rectangular in form have a slight clearance with respect to the surfaces 192 and 193 so that this block is vertically movable freely in its housing chamber.

Means are provided for urging this movable block 51 downwardly to clamp the same against the tape 50 intermediate it and the fixed lower block 49. Such means are shown as operating on pneumatic fluid and including a bladder member 197 having a mouth 198 surrounded by a lip portion 199. The bladder member 197 has an external shape corresponding to that of the recess 190 in the housing 189. Internally, the top wall of the bladder member 197 is provided with several integral depending projections or cores 200. These tend to reduce the volume of the cavity 201 of the bladder member. It will be seen that the flexible lower wall of the bladder member 197 overlies the upper flat surface of the movable block 51. The lip portion 199 is received in the enlarged recess portion 191 but the exposed or rear surface of this lip portion engages the front surface of the back plate 168 and therefore forms its own gasket for the bladder member. Compressed air is admitted to the cavity 201 of the bladder member through a tube 202 which is mounted on the back plate 168 and extends therethrough. The other end of the tube 202 is shown in FIG. 19 as connected to the interior of the T 83. It will be seen that by inflating the bladder member 197, the movable block 51 will be forced downwardly.

Means are provided to resist yieldingly the downward movement of the block 51 and also to provide for retrogression of this block, all while guiding the block in its vertical movement to assume proper registery of the ports 52 and 48. Such means are shown in FIG. 14 as comprising a spring indicated generally at 203 including a generally rectangular leaf portion 204 surrounding the movable block 51 and fitting into the bottom opening of the housing 189. This leaf portion 204 is shown as having an inturned lug element 205 and also a boss element 207 arranged at each corner of the movable block 51. Each of these lug elements 205 is adapted to engage a downwardly facing shoulder 206 formed on the end of the block 51 by undercutting the end wall thereof. The boss elements 207 engage the corresponding side surfaces of the block 51. The spring member 203 is also shown as including a pair of integral flexible support arms 208 which extend inwardly from the opposite narrow ends of the rectangular leaf portion. The inner end of each spring arm 208 is secured to the lower end of a wall portion 209 of the housing 189, as by a screw 210. Each of the screws 210 has a threaded shank which passes through a hole in the end of the spring arm 208 and is received in a threaded recess provided in the corresponding housing portion 209.

When the bladder member 197 is inflated, the vent block 51 is forced downwardly against the urging of the spring 203. When the interior of the bladder member 197 is vented, the spring 203 will restore or lift the vent block 51.

Figure 11:
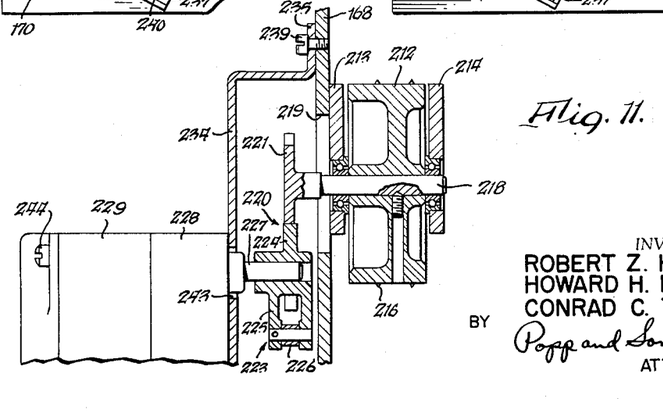
FIG. 11 is a transverse view of the tape reader mechanism, generally taken along line 11—11 of FIG. 9.

Means are provided for intermittently moving a predetermined length of the tape 50 along the track surface 172. Such means are shown in FIGS. 11-13 as comprising a sprocket wheel 212 suitably journalled for rotation about a horizontal transverse axis on side wall portions 213 and 214 which are left after providing one end of the fixed block 49 with a recess 215 to accommodate this sprocket wheel. The sprocket wheel is shown as having a row of circumferentially spaced teeth 216 which are aligned with the groove 178 over which the holes 75 in the tape 50 pass so that these teeth 216 enter the tape holes 75. The sprocket wheel 212 is fast to a horizontal shaft 218 which extends rearwardly through a hole 219 provided in the back plate 168, as shown in FIG. 11.

Figure 10:
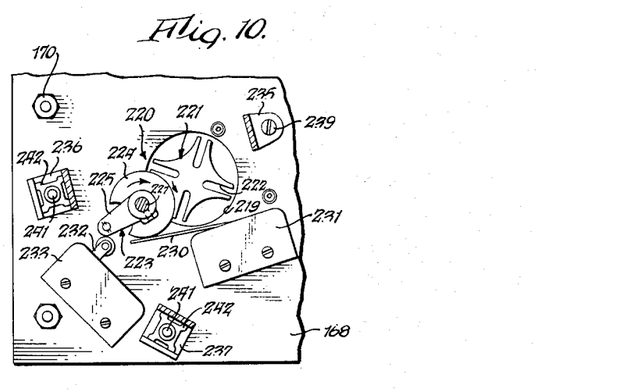
FIG. 10 is a view similar to FIG. 9 but at a lower plane and revealing the Geneva mechanism forming part of the intermittent drive for the sprocket wheel of the tape reader mechanism.

Suitable drive means are provided for imparting a predetermined but adjustable angular movement to the sprocket wheel 212. Such means are shown in FIGS. 10 and 11 as comprising a Geneva mechanism indicated generally at 220. This mechanism includes a Geneva cross member 221 having a series of radial slots 222 each adapted to cooperate successively with a Geneva cam member 223. This cam member has a partial cylindrical hub 224 and an arm 225 the outer end of which carries a roller 226. The cam member 223 is fast to the output or driven shaft 227 of a gear reducer 228 driven by an electric motor 229. As shown in FIG. 10, the Geneva cam member 223 is adapted to engage the trip 230 of an electric switch 231 and also the trip 232 of a second electric switch 233. The switches 231 and 233 are suitably fastened to the rear side of the back plate 168. Switch 231 is operatively associated with the air solenoid valve 57 (FIG. 4) and switch 233 is operatively associated with electric motor 229.

The superposed cases of the Geneva cam drive motor 229 and gear reducer 228 are mounted on a bracket 234 which covers the Geneva mechanism 220 and has three downturned integral legs with feet 235, 236 and 237 which rest on the rear surface of the back plate 168. The foot 235 is provided with a close fitting hole to receive the shank of a pivot screw 239 which passes through this hole and screws into a threaded recess provided in the back plate 168. Each of the feet 236 and 237 is provided with an enlarged hole 240 through which the shank of a fastening bolt 241 extends. These bolts 241 pass through holes in the back plate 168 and each carries a nut 242 which bears against the outer surface of the corresponding foot 236 or 237. It will thus be seen that by loosening the nuts 242 and the screw 239, the motor support bracket 234 is capable of being swung or pivoted around the axis of the pivot screw 239, the enlarged holes 240 in the bracket permitting such movement within certain elements. Once the desired adjustment is achieved, the nuts 242 are retightened as well as the pivot screw 239 so as to firmly hold the motor support bracket 234 against the back plate 168.

Figure 3:
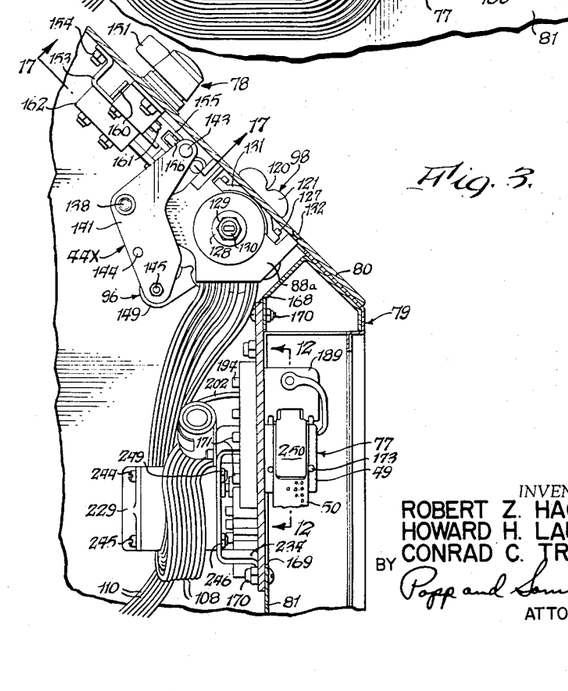
FIG. 3 is a vertical sectional view through the console shown in FIG. 1 and showing the control mechanisms depicted in FIG. 2 as viewed from the right end thereof.
Figure 9:
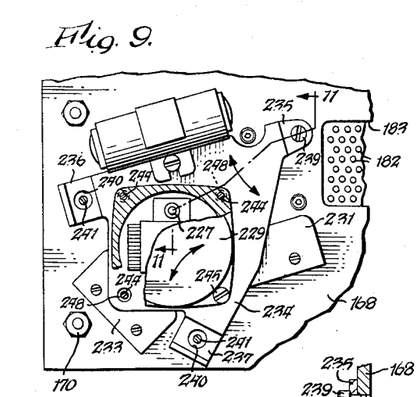
FIG. 9 is a fragmentary rear elevational view of the right hand portion of the tape reader mechanism as shown in FIG. 8, certain parts being partially broken away to reveal hidden structure.

The electric motor 229 and gear reducer 228 as a unit are adjustably mounted on the bracket 234. For this purpose, the cases of the reducer and motor are provided with registered holes adjacent their four corners to receive through bolts, three of which are indicated at 244 and one of which is indicated at 245 in FIGS. 2 and 9. The end of the bolt 245 adjacent the bracket 244 passes through a closely fitting hole in this bracket and is secured thereto by a nut 246 (FIG. 3). The ends of the other bolts 244 pass through enlarged holes 248 provided in the bracket 234 and the extremities of these bolts carry nuts 249 (FIG. 3). The bolt 245 serves as a pivot bolt. By loosening this and the other bolts 244, the motor 229 and reducer 228 can be swung as a unit about the axis of the pivot bolt 245. When the desired adjustment is achieved, the bolts 244 and 245 are tightened. The shaft 227 extends through an enlarged hole 243 in the bracket 234.

The above described adjustment of the bracket 234 relative to the back plate 168 about the axis of the pivot screw 239 determines the orientation of the Geneva cam member 223 relative to the Geneva cross member 221 and thereby the initial and final angular positions of the sprocket wheel 212 whereby the longitudinal orientation of the tape 50 relative to the reader area 174 and the ports 48 therein is determined. The adjustment of the motor and reducer unit 229, 228 relative to the bracket 234 about the axis of the pivot bolt 245 determines the backlash between the Geneva cross and the cam members 221 and 223, respectively.

Retractible guide means are provided for holding the tape 50 against the track on the fixed reader block 49 at each end of the track. Such means comprise a first hold-down plate 250 arranged at the entrance or left end of the track as viewed in FIG. 12, and a second hold-down plate 251 arranged at the outlet or right end of the track. Each of the hold-down plates includes a rounded terminal part 252 which embraces the corresponding end of the track and each plate also includes an upstanding part 253 having a pair of laterally extending parallel arms 254. The ends of the arms 254 are provided with aligned horizontal holes which receive a horizontal pivot pin 255 suitably supported on the housing 189, as best shown in FIG. 16. The pin 255 for each of the hold-down plates 250 and 251 extends transversely of the tape track. Operatively interposed between the housing 189 and the corresponding one of the plates 250 and 251 is a spring 256. It is shown as a wind-up spring having convolutions surrounding an intermediate portion of the corresponding pivot pin 255. The springs 256 are so arranged that the plate 250 is urged to swing in a counterclockwise direction around its pivot pin 255, as viewed in FIG. 12, and the other plate 251 in a clockwise direction about the axis of its pivot pin 255. The curved portion 252 of the hold-down plate 251 is shown as having a slot 262 through which the teeth 216 of the sprocket wheel 212 can project.

Cam means are provided for manually raising the tape hold-down plates 250 and 251 by rotating them opposite to the respective directions just mentioned. For this purpose, a cam shaft 258 is journalled on the housing 189 and extends longitudinally of the tape track over the inflatable bladder member 197. One end of the shaft extends outwardly of the housing and has fast thereto a lever or fingerpiece 259. Adjacent the upright portion 253 of each plate 250 and 251 the shaft 258 is provided with a cam surface 260 which is formed by providing a notch in the shaft. The flat base surface of each notch 260 engages the corresponding upper horizontal flat edge of the upright portion 253. It will be seen that by rotating the cam shaft 258 as by manipulating the fingerpiece 259, the cam surfaces 260 can depress the upper portions 253 of the plates 250 and 251 causing them to lift away from the tape track. Preferably, a spring wire 261 is bowed over the upper surface of the cam shaft adjacent each end thereof to provide a frictional resistance to turning of the shaft. The ends of each such spring wire 261 are shown as received in suitable recesses provided in the housing 189.

*Operations: Manual control*

The selector lever 151 (FIG. 1) is manually placed in the set position so that the arm 155 is placed in the position 155S (FIG. 17). In this position, the switch 160 is disengaged so that the air solenoid valve 57 (FIG. 4) is not energized and remains closed. The actuator bar 143 is in its set position 143S (FIG. 17) and the shift bar 145 is in the position 145S (FIG. 19) so as to be withdrawn from the notches 120 in the dial members 98. The mode members 96 are in the manual position 96M (FIG. 19).

The various dial members 98 of both manual control mechanisms 44X and 44Y may now be adjusted to represent the desired dimensions for movement of the table and saddle members along the X and Y axes. With the hollow shafts 82 and 82Y being unfilled with compressed air, the pistons 95 are not urged to a clamping position, thereby leaving the various dial members 98 to be freely rotatable. During rotation of these dial members, their individual detent rollers 140 successively engage the recesses between nodes 121 and yieldingly hold the corresponding dial member in any desired station. Rotation of these dial members 98, one for each digit, sets up a pattern of their holes 122 with the holes 111 in the mode members 96. These holes 111 are severally alined with the ports 99 in the corresponding port members 88.

After the dial members have been manually set as desired, the operator then moves the selector lever 151 to the lock position thereby moving the arm 155 to the position 155L (FIG. 17). This moves the actuator bar 143 to the position 143L engaging the trip 161 for the switch 160. This switch now becomes operative to energize a circuit through the air solenoid valve 57 (FIG. 4) thereby allowing air in the main conduit 43 upstream of the air solenoid valve 57 to flow past this valve. This admits air into conduit 84 (comparable to conduit 43 in FIG. 4) which in turn through the T 83 supplies compressed air to the interiors of the hollow shafts 82 and 82Y.

Compressed air passes through the radial holes 86, annular grooves 85, into the passages 101 of the various port members 88. Some fluid enters through the holes 125 into the cylinder chambers 94 for the various pistons 95 thereby urging the same to clamp their associated dial member 98 and mode member 96 against the adjacent port member 88.

Compressed air is also admitted into the manifold chamber 102. Through the orifices 109 in the various tubes 105, pressurized air enters the interiors of the tubing 110 and the passages 103. The tubes 110 lead to the various transducer chambers 60.

It will be seen that if a particular port 99 is vented to the atmosphere via a hole 111 in the mode member 96 in registry with a hole 122 in the corresponding dial member 98, such hole 122 being in communication with the atmosphere via the clearances 123 and 124 (FIGS. 27 and 28), the corresponding transducer chamber 60 (FIG. 5) is vented to the atmosphere. If so vented to the atmosphere, the corresponding transducer diaphragm 64 will assume the position shown at the top in FIG. 5 thereby allowing the corresponding transducer piston 68 to move leftward and shift the corresponding valve plate. On the other hand, if an alined port 99 and hole 111 is blocked by a surface portion of the land 113 on the dial member 98, the pressure of the corresponding transducer chamber 60 will be maintained. This maintained pressure will cause the corresponding transducer diaphragm to assume the flexed position illustrated at the bottom of FIG. 5 thereby holding the corresponding transducer piston and connected valve plate in their rightward position.

Figure 29:
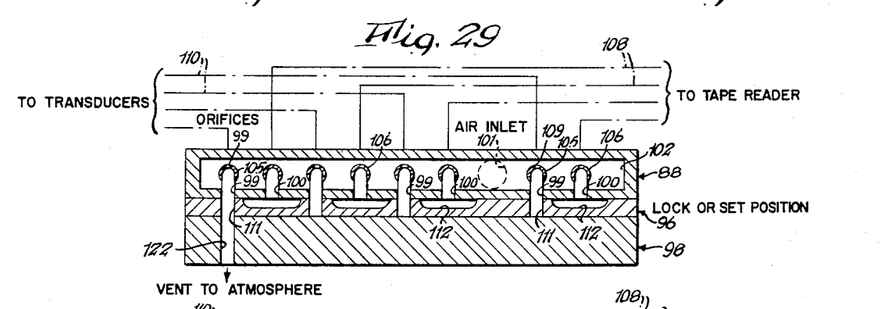
FIG. 29 is a developed diagrammatic view of the manual control means, showing the same arranged for lock or set position.

The relationship of a port member 88, mode member 86 and dial member 98, when the mode of operation is selected for manual control, is depicted diagrammatically in FIG. 29. There it will be seen that the various tubes 105 communicate with the manifold chamber 102 via the orifices 109 in such tubes. Also, the ports 99 communicate with the holes 111. In FIG. 29 only one hole 122 in the dial member 98 is illustrated and this is shown in alinement with the corresponding hole 111 in the mode member 96. Thus the leftmost tube 105 will be vented to the atmosphere and hence the transducer chamber 60 associated therewith. This allows the corresponding transducer diaphragm 64 to separate from the corresponding nozzle 65 and shift the corresponding transducer piston 68 and valve plate 15 connected thereto. The other holes 111 shown in FIG. 29 are blocked by imperforate surface portions of the land 113 of the dial member 98. Therefore the transducer chambers 60 associated with such blocked tubes 105 will have their pressure maintained so as to flex the corresponding transducer diaphragm 64 as depicted at the bottom of FIG. 5.

When the positioner is set up for manual control, it will be seen that the tape reader mechanism 77 is inoperative, this because the ports 100 in the port member 88 are blocked by the mode member 96 and are not placed in communication with the corresponding ports 99.

It will also be noted that when the selector lever 115 is changed from its set to its lock position so that the arm 155 moves from position 155S to 155L, the actuator bar 143 follows in moving from its position 143S to its position 143L. This is due to the urging of the various detent springs 146 which biases the end plate-bar assembly 141–145 to a counterclockwise direction as viewed in FIG. 21 or a clockwise direction as viewed in FIG. 19. Such movement swings the shift bar 145 from its position 145S at the radially outer end of the arcuate portions 150 of the slots 148 in the various mode members 88, to its position 145L at the radially inner end of the arcuate portions 150 and into the notches 120 in the dial members 98 thereby locking these dial members against rotation. The shift bar 145 entering the notches 120 assures the proper registry of the holes 122 in the dial members 98 with the holes 111 in the mode members 96.

*Operation: Tape control*

When the selector lever 151 is manually turned to a tape position, the arm 155 associated with this lever will move to the tape position 155T (FIG. 17). This causes the actuator bar 143 to assume the tape position 143T and the shift bar 145 the tape psoition 145T. In moving to position 145T, the shift bar moves into the radially outer portion of the slots 148 in the mode members 96 thereby shifting them to the tape position 96T represented in FIG. 19. Now the mode members 98 have been angularly moved or pivoted about the axis of the hollow shafts 82 and 82Y to move the recesses 112 in the mode members into a position with respect to the ports 99 and 100 in the corresponding port member 88 so as to place corresponding and predetermined pairs of these ports in communication with each other.

Figure 30:
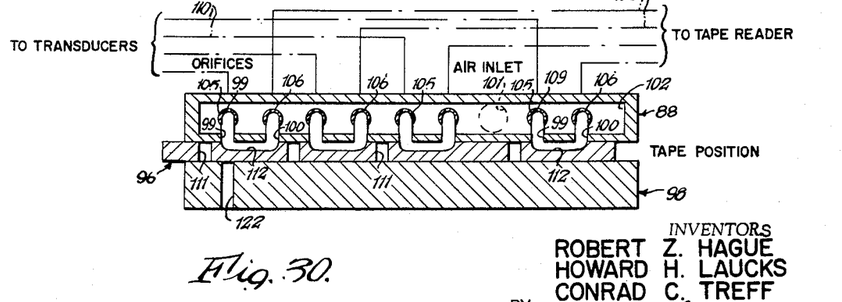
FIG. 30 is a view similar to FIG. 29 but showing the manual control means set for tape control position.

This is diagrammatically depicted in FIG. 30. There it will be seen that the mode member 96 has been shifted so that the recesses 112 therein now establish communication between corresponding pairs of ports 99 and 100. The holes 111 in the mode member 96 have been shifted laterally of the ports 99 so that these ports cannot be vented through the dial member 98.

If air is now supplied to the interior of the hollow shafts 82 and 82Y, the pistons 95 will clamp the associated dial members 98 and mode members 96, as previously explained, to prevent leakage between opposing faces. Also air entering the tubes 105 through the orifice 109 therein will flow through the corresponding recesses 112 and be by-passed to the corresponding tubes 106. These tubes are in communication through the tubing 108 with the ports 48 in the tape reader mechanism.

It is assumed that the tape 50 is in the intended position between the surfaces 172 and 185 of the blocks 49 and 51, respectively. The portion of the tape 50, such as a twenty row block, overlying the track area 174 on fixed block 49 will have perforations therein corresponding to the desired dimensions intended for both the X axis and Y axis. Thus, some of the ports 48 will be blocked by the tape whereas others will be uncovered by alined perforations in the tape. The uncovered ports 48 will then be placed in communication with the overlying and alined corresponding ports 52 in the vent block 51. The ports 48 are in communication with the atmosphere.

What turns on the compressed air supply is switch 162 (FIG. 17) rendered operative when arm 155 is in its tape position 155T. Switch 162 when so actuated closes a circuit through air solenoid valve 57 (FIG. 4) to open this valve and allow compressed air to flow through conduit 84, T 83 into the interiors of hollow shafts 82 and 82Y and also through the tube 202 into the interior of the bladder member 197. Compressed air within the hollow shafts 82 and 82Y will allow the compressed air to follow the course previously explained leading to the transducer chambers 60. Compressed air entering the bladder member 197 will inflate the same thereby clamping vent block 51 against the tape 50 which in turn overlies the reading area 174 on the fixed block 49.

It will be understood that successive and different positions of the table and saddle members may be desired to be commanded by the perforated tape 50. For this, it is necessary to position another predetermined length or block of tape 50 between the reader heads 49 and 51. Suitable cycling means (not shown) will de-energize the air solenoid valve 57 so as to vent the cavity of inflatable bladder 197 thereby permitting the spring 203 to lift the vent block 49. At some suitable subsequent time the electric motor 229 is energized thereby rotating the Geneva cam 223 in a clockwise direction as viewed in FIG. 10 starting from the position there illustrated. During the rotation of the cam member 223, the roller 226 will enter the adjacent slot 222 in the Geneva cross member 221 and cause this member to rotate in a counterclockwise direction as viewed in FIG. 10. Thus the cross member 221 and the sprocket wheel 212 will be driven through a one-quarter revolution. As the cam 226 leaves the slot 22 which it had entered to effect the quarter turn drive, the arm 223 will engage the trip 230 of the switch 231. This switch will be in circuit with the air solenoid valve 57 and actuate this valve as previously explained.

The Geneva cam member 223 will continue to rotate, leaving the trip 230 and successively engaging the trip 232 of the other switch 233. The switch 233 is operatively associated with a circuit including the motor 229, this switch being operative to stop this motor, thus leaving the Geneva cam member 233 in the position illustrated in FIG. 10

The reading act takes only a relatively short time such as five seconds. Thus the compressed air is admitted to the hollow shafts 82 and 82Y and to the inflatable bladder member 197 for this brief time. Usually a machining operation of considerably longer duration follows a tape reading during which time and while the air solenoid valve 57 is closed, the tape 50 is advanced so that a new block of tape can be read, if the mode of operation is adjusted for automatic tape control.

There may be a semi-automatic tape control mode of operation in which a manually controlled operation is desired to follow a tape controlled operation. If so, after the tape has been read for the last time, the compressed air supply being turned off and the clamping pistons 95 being relieved, the dial members 98 are free to be rotated to the manually selected positions desired. Then when the actuator lever 151 is turned to lock, the positioner will go into a manual control mode of operation with the dimension control already set up. Thus the dial members 98 can be manually set while a machining operation is being performed after the tape has been read for the last time.

From the foregoing it will be seen that the embodiment of the invention illustrated and described achieves the various objects stated. The embodiment is intended as illustrative rather than limitative of the invention the scope of which is to be determined by the appended claims.

What is claimed is:

1. In a positioner for a movable member, the combination comprising means for moving said member, fluid operated transducer means operatively associated with said moving means for controlling the operation thereof and including a plurality of chambers, and manually settable means for controlling the operation of said transducer means and including a plate member having a plurality of ports in one side thereof and arranged in circumferentially spaced relation at a substantially uniform radius from an axis and severally communicating with said chambers and with a source of pressurized fluid and a vent member rotatable relative to said plate member about said axis and having vent openings at circumferentially spaced intervals and communicable with said ports in various predetermined arrangements depending upon the setting of said vent member.

2. In a positioner for a movable member, the combination comprising means for moving said member, fluid operated transducer means operatively associated with said moving means for controlling the operation thereof and including a plurality of chambers, and manually settable means for controlling the operation of said transducer means and including a plate member having a plurality of passages terminating at their corresponding ends severally in a plurality of ports in one side of said plate member, said ports being arranged in circumferentially spaced relation at a substantially uniform radius from an axis, means establishing communication severally between said passages and chambers, means providing restricted inlet orifices severally to said passages for pressurized fluid and a vent member rotatable relative to said plate member about said axis and having vent openings at circumferentially spaced intervals and communicable with said ports in various predetermined arrangements depending upon the setting of said vent member.

3. In a positioner for a movable member, the combination comprising hydraulic fluid operated actuator means for moving said member, selector valve means for controlling flow of hydraulic fluid with respect to said actuator means and including a plurality of slidable valve plates, and pneumatic-to-hydraulic transducer means operatively associated with said selector valve means and including for each of said valve plates first, second, third and fourth chambers, a diaphragm separating said first and second chambers, a nozzle connecting said second and third chambers and adapted to be closed by said diaphragm when the pressure of command pneumatic fluid in said first chamber exceeds the pressure of hydraulic fluid in said second chamber, a slidable double acting piston separating said third and fourth chambers and connected to the corresponding one of said valve plates and having differential end areas the larger of which is exposed to said third chamber, means arranged to supply pressurized hydraulic fluid to said third and fourth chambers, and means arranged to connect said second chamber to a hydraulic fluid return.

References Cited by the Examiner

UNITED STATES PATENTS

| | | | |
|---|---|---|---|
| 2,522,481 | 9/1950 | Martin | 91—461 X |
| 2,689,548 | 9/1954 | Holm | 91—461 X |
| 2,982,902 | 5/1961 | Le Gates | 91—37 X |
| 3,156,157 | 11/1964 | Smith | 91—48 |

FOREIGN PATENTS 337,365  3/1936  Italy.

SAMUEL LEVINE, *Primary Examiner.*
FRED E. ENGELTHALER, *Examiner.*
P. T. COBRIN, *Assistant Examiner.*